United States Patent
Haviv et al.

(10) Patent No.: US 8,726,245 B2
(45) Date of Patent: May 13, 2014

(54) STATIC ANALYSIS OF COMPUTER SOFTWARE APPLICATIONS HAVING A MODEL-VIEW-CONTROLLER ARCHITECTURE

(75) Inventors: Yinnon A. Haviv, Beerotaim (IL); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/016,364

(22) Filed: Jan. 28, 2011

(65) Prior Publication Data

US 2012/0198417 A1 Aug. 2, 2012

(51) Int. Cl.
*G06F 9/44* (2006.01)
*G06F 9/45* (2006.01)

(52) U.S. Cl.
USPC ............ 717/131; 717/104; 717/106; 717/141

(58) Field of Classification Search
None
See application file for complete search history.

(56) References Cited

U.S. PATENT DOCUMENTS

| | | |
|---|---|---|
| 6,950,850 B1 | 9/2005 | Leff et al. |
| 7,225,424 B2 | 5/2007 | Cherdron et al. |
| 8,190,807 B2 * | 5/2012 | Reid et al. .......................... 711/3 |
| 2002/0109734 A1 | 8/2002 | Umezu et al. |
| 2006/0059127 A1 | 3/2006 | Berry et al. |
| 2007/0061176 A1 | 3/2007 | Gress et al. |
| 2009/0158243 A1 | 6/2009 | Bolarinwa |

OTHER PUBLICATIONS

Richard Mischook, "Building Dynamic Web Applications". [online], [Retrieved on Mar. 25, 2010], Retrieved from the Internet at <URL: http://www.killersites.com/articles/MVC.htm>, 4 pp.

J. Wojciechowsk et al., "MVC Model, Struts Framework and File Upload Issues in Web applications Based on J2EE Platform", TCSET'2004, Feb. 24-28, 2004, Lviv-Slaysko; Ukraine. URL: ieeexplore.ieee.org/iel5/9428/29914/01365980.pdf.

"Model-View-Controller Pattern". [online], [Retrieved on Jan. 17, 2011], Retrieved from the Internet at <URL: http://www.enode.com/x/markup/tutorial/mvc.html>, 2 pp.

* cited by examiner

*Primary Examiner* — Chuck Kendall
(74) *Attorney, Agent, or Firm* — North Shore Patents, P.C.; Michele Liu Baillie; Lesley Leonessa (57) ABSTRACT

Preparing a computer software application for static analysis by identifying a control flow within a model portion of a computer software application having a model-view-controller architecture, where the control flow passes a value to a controller portion of the computer software application, analyzing a declarative specification of the controller portion of the computer software application to identify a view to which the controller portion passes control based on the value, and synthesizing a method within the computer software application, where the method calls the view.

25 Claims, 8 Drawing Sheets

```
public ActionForward perform(ActionMapping mapping,
                             ActionForm form,
                             HttpServletRequest request,
                             HttpServletResponse response)
                      throws IOException,
ServletException {
    // Extract attributes and parameters we will need
    JoinForm joinForm = (JoinForm) form;
    String email = joinForm.getEmail();
    ActionErrors errors = new ActionErrors();
    String forwardID;
    // store input....
    try {                                                    300
        business.db.MailingList.AddEmail(email);
    } catch (Exception e) {
        // log, print stack
        // display error back to user
        errors.add("email",new
ActionError("error.mailing.db.add"));
    }
    // If any messages is required, save the specified error
messages keys
    // into the HTTP request for use by the <struts:errors>
tag.
    if (!errors.empty()) {
        saveErrors(request, errors);
        // return to the original form
        forwardID = "failure";
        return (mapping.findForward(forwardID)); // (*)
    } else {
        // Forward control to the specified 'success' URI that
is in the Action.xml
        forwardID = "success";
        return (mapping.findForward(forwardID)); // (**)
    }
}
```

Fig. 3A

```
<action  path="/join"
        name="joinForm"
        type="web.mailinglist.JoinAction"
        scope="request"
        input="/joinMVC.jsp"
     validate="true">
   <forward  name="failure"  path="/joinMVC.jsp"/>
   <forward  name="success"  path="/JoinSuccessful.jsp"/>
</action>
```
302

```
if (forwarded.equals("success") {
     request.redirectTo("JoinMVC.jsp");
} else {
     request.redirectTo("JoinSuccessful.jsp");
}
```
304

```
HelloWorld.java
package org.apache.struts.helloworld.action;
import org.apache.struts.helloworld.model.MessageStore;
import com.opensymphony.xwork2.ActionSupport;
public class HelloWorldAction extends ActionSupport {
    private static final long serialVersionUID = 1L;
    private MessageStore messageStore;
    public String execute() throws Exception {
        messageStore = new MessageStore() ;
        return SUCCESS;
    }
    public MessageStore getMessageStore() {
        return messageStore;
    }
    public void setMessageStore(MessageStore messageStore) {
        this.messageStore = messageStore;
    }
}
```

500

```
<?xml version="1.0" encoding="UTF-8" ?>
<!DOCTYPE struts PUBLIC
"-//Apache Software Foundation//DTD Struts Configuration
2.0//EN"
"http://struts.apache.org/dtds/struts-2.0.dtd">
<struts>
<constant name="struts.enable.DynamicMethodInvocation"
value="false" />
<constant name="struts.devMode" value="true" />
<package name="roseindia" namespace="/roseindia"
extends="struts-default">
<action name="HelloWorld"
class="net.roseindia.Struts2HelloWorld">
<result>/pages/HelloWorld.jsp</result>
</action>
<!-- Add actions here -->
</package>
<!-- Add packages here -->
</struts>
```

```
void SyntheticRoot() {
    …
    new HelloWorld().execute();
/* For full support, instrument the execute method to invoke
the HelloWorld.jsp view directly. */
    …
}
```
504

Fig. 5B

STATIC ANALYSIS OF COMPUTER SOFTWARE APPLICATIONS HAVING A MODEL-VIEW-CONTROLLER ARCHITECTURE

FIELD OF THE INVENTION

The invention relates generally to static analysis of computer software applications.

BACKGROUND OF THE INVENTION

The Model-View-Controller (MVC) design architecture is a computer software application design architecture in which those elements of a computer software application that present data to an application user or receive input from the user (i.e., the "user interface" or "presentation layer"), referred to as the application "view", are separated from those elements of the application that access stored data and process and transform data (i.e., the "business logic layer" or "domain layer"), referred to as the application "model". In the MVC architecture, a "controller" determines when control of the application during its execution is passed to a view element or a model element.

Static analysis is often performed on computer software application source code to identify issues such as logic errors and security vulnerabilities. However, traditional static analysis techniques do not provide sufficiently precise results for MVC-based applications where the controller logic is external to the application source code, as the controller logic is either approximated in an overly-conservative manner, thereby creating invalid control-flow paths between the model and the view layers, or an under-approximation is used, in which case certain valid flows are simply ignored.

SUMMARY OF THE INVENTION

Method, system and computer program product embodiments of the invention are provided for preparing a computer software application for static analysis, including identifying a control flow within a model portion of a computer software application having a model-view-controller architecture, where the control flow passes a value to a controller portion of the computer software application, analyzing a declarative specification of the controller portion of the computer software application to identify a view to which the controller portion passes control based on the value, and synthesizing a method within the computer software application, where the method calls the view.

BRIEF DESCRIPTION OF THE DRAWINGS

The invention will be understood and appreciated more fully from the following detailed description taken in conjunction with the appended drawings in which:

FIG. 3 (consists of FIGS. 3A and 3B) is a simplified example of model and controller portions of a computer software application useful in understanding the method of FIG. 2;

FIG. 5 (consists of FIGS. 5A and 5B) is a simplified example of model and controller portions of a computer software application useful in understanding the method of FIG. 4.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
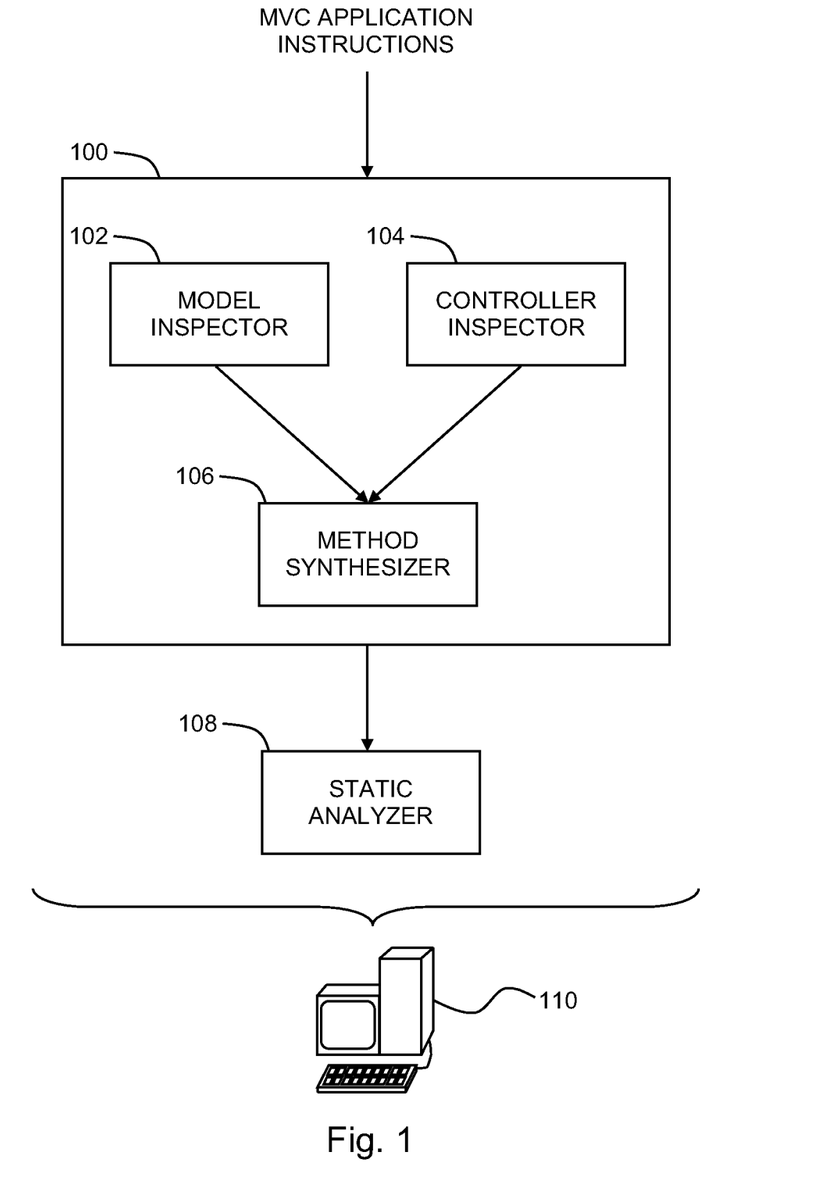
FIG. 1 is a simplified conceptual illustration of a system for static analysis of computer software applications, constructed and operative in accordance with an embodiment of the invention.

Reference is now made to FIG. 1, which is a simplified conceptual illustration of a system for static analysis of computer software applications, constructed and operative in accordance with an embodiment of the invention. In the system of FIG. 1, a static analysis preprocessor 100 is shown that is configured to process the instructions, such as may be in the form of source code or object code, of a computer software application having an MVC architecture, prior to performing conventional static analysis of the computer software application. Preprocessor 100 preferably includes a model inspector 102 that is configured to identify one or more control flows within a model portion of the computer software application, where each control flow passes one or more values to a controller portion of the computer software application. Preprocessor 100 also preferably includes a controller inspector 104 that is configured to analyze a declarative specification of the controller portion of the computer software application to identify one or more views to which the controller portion passes control based on the value(s) passed by any, and preferably every, one of the identified control flows. Preprocessor 100 also preferably includes a method synthesizer 106 that is configured to synthesize a method, such as within the model portion of the computer software application, where the synthesized method directly calls any, and preferably every, one of the identified views, and/or indirectly calls the views preferably other than via the controller portion of the computer software application. The synthetic method is preferably included with the computer software application instructions when static analysis is performed by a static analyzer 108 in accordance with conventional techniques.

In an alternative embodiment, controller inspector 104 is configured to analyze a declarative specification of the controller portion of the computer software application to identify one or more control flows from the controller portion of the computer software application to the model portion of the computer software application, model inspector 102 is configured to identify, for any, and preferably every, identified control flow, an entry point corresponding to the control flow within the model portion of the computer software application, and method synthesizer 106 is configured to synthesize a root method, such as within the model portion of the computer software application, where the root method directly or indirectly calls any, and preferably every, one of the identified entry points other than via the controller portion of the computer software application.

Any of the elements shown in FIG. 1 are preferably executed by or otherwise accessible to a computer 110, such as by implementing any of the elements shown in FIG. 1 in computer hardware and/or in computer software embodied in a computer-readable storage medium in accordance with conventional techniques.

Figure 2:
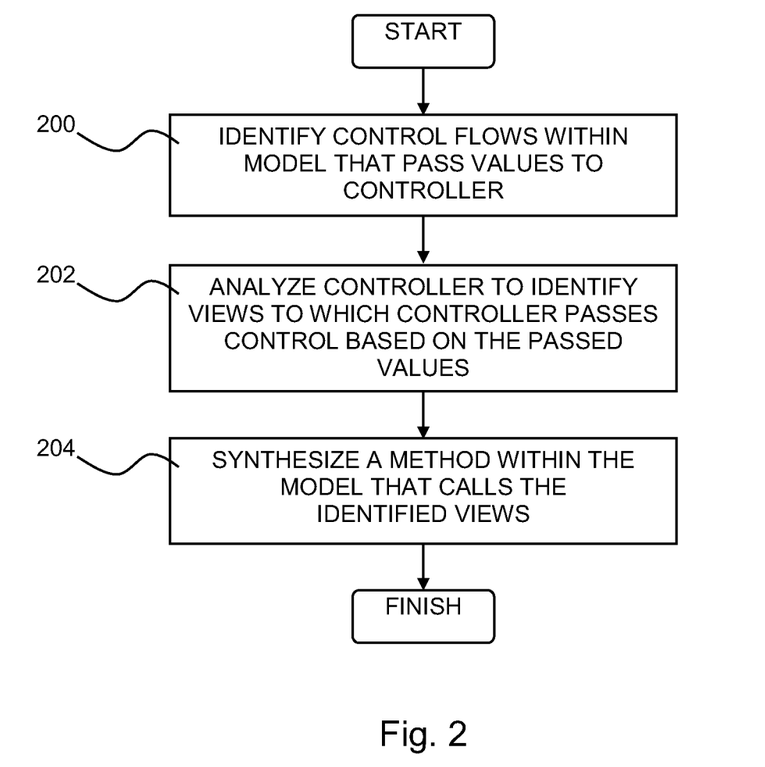
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an alternative embodiment of the invention. The method of FIG. 2 may be performed to prepare an MVC-based computer software application for static analysis by identifying view elements of the application to which control is passed by the application controller. In the method of FIG. 2, one or more control flows are identified within a model portion of a computer software application having an MVC architecture, where each control flow passes one or more values to a controller portion of the computer software application (step 200). For each identified control flow, a declarative specification of the controller portion is analyzed to identify one or more views to which the controller portion passes control based on the value(s) passed by the control flow (step 202). A method is synthesized, such as within the model portion of the computer software application, where the method directly or indirectly calls any, and preferably every, one of the identified views other than via the controller portion of the computer software application (step 204).

The values passed to the controller portion of the computer software application may be approximated for the static analysis using conventional techniques. For example, the values may be modeled using an abstract representation, such as the set of all characters appearing in literal strings representing the values, where the set of concrete values arising during any possible execution of the application may be mapped to the abstract values used to represent the values.

Figure 3A:
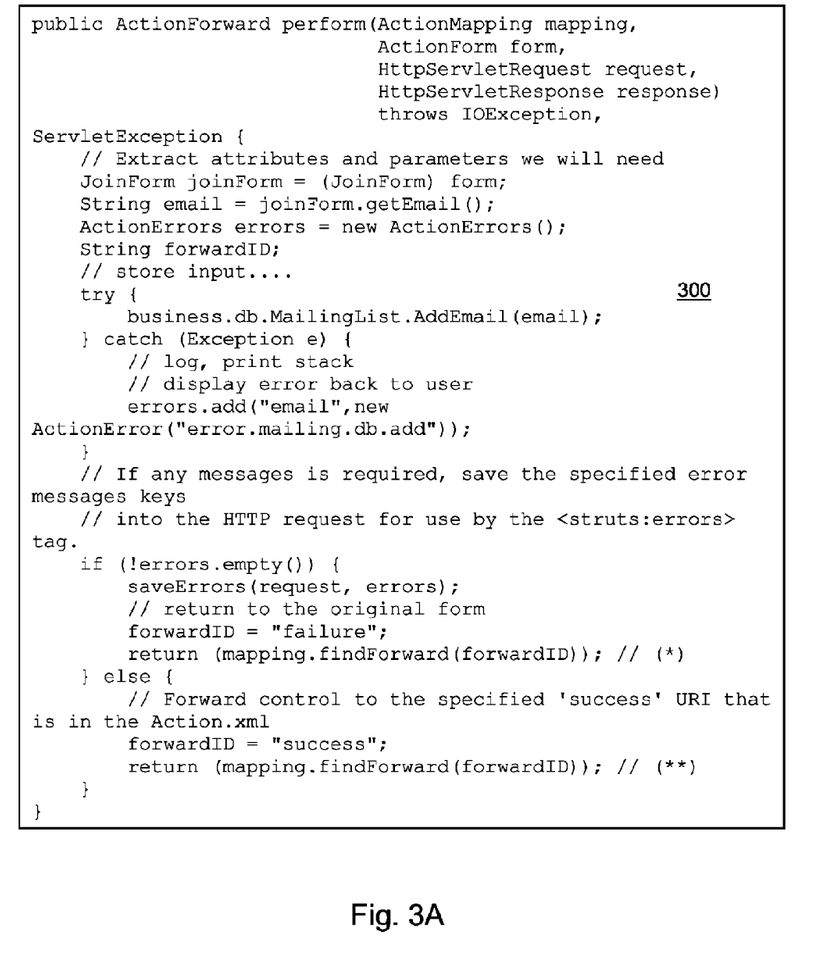
Figure 3B:
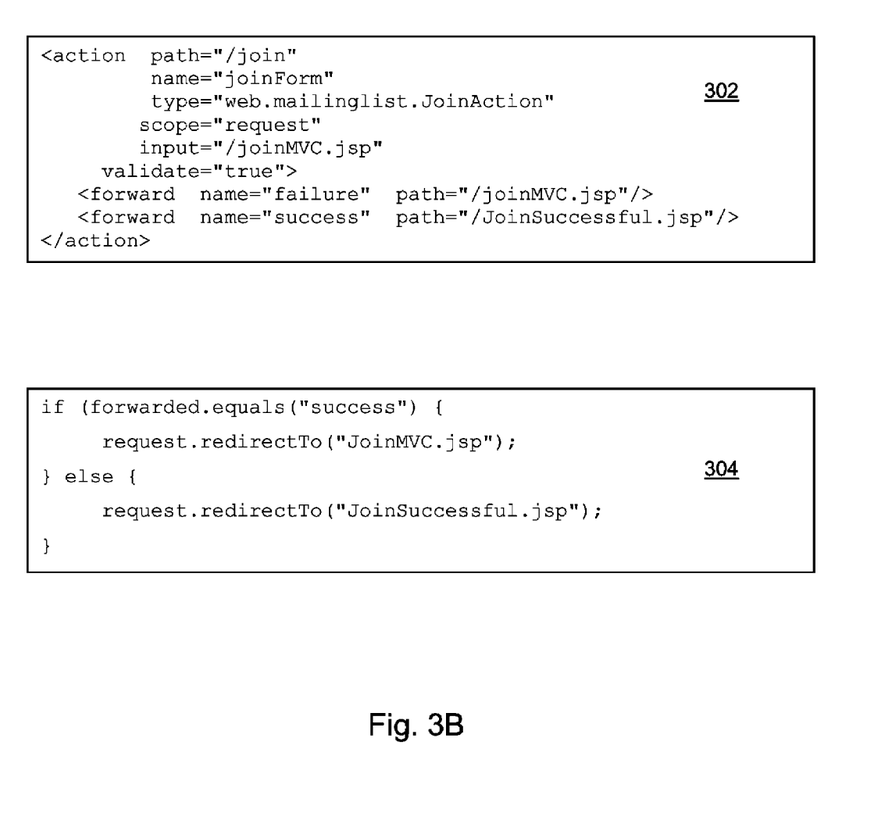

Reference is now made to FIGS. 3A and 3B which, taken together, is a simplified example of model and controller portions of a computer software application useful in understanding the method of FIG. 2. In FIGS. 3A and 3B a model portion 300 and a controller specification 302 are shown of an application built using the Struts open-source MVC framework. In the example shown, there are two possible control-flow paths extending the call to perform( ) and the result of the branching decision is made based on the concrete value of the 'forwardID' variable, which is resolved into either of the values "failure" or "success". The mappings "success"<->"joinMVC.jsp"
"failure"<->"JoinSuccessful.jsp"

resolve to forwardID<->"success" at (*)
forwardID<->"failure" at (**)

which represent the control-flow paths (*)->the entry point into "joinMVC.jsp"
(**)->the entry point into "JoinSuccessful.jsp".

A synthesized method 304 is shown, such as for inclusion within the model portion of the computer software application during static analysis, where the method directly calls the identified views. The syntax of 'request.redirect To' is a pseudocode simplification of actual syntax used in Java. (Java and all Java-based trademarks and logos are trademarks or registered trademarks of Oracle and/or its affiliates.)

Figure 4:
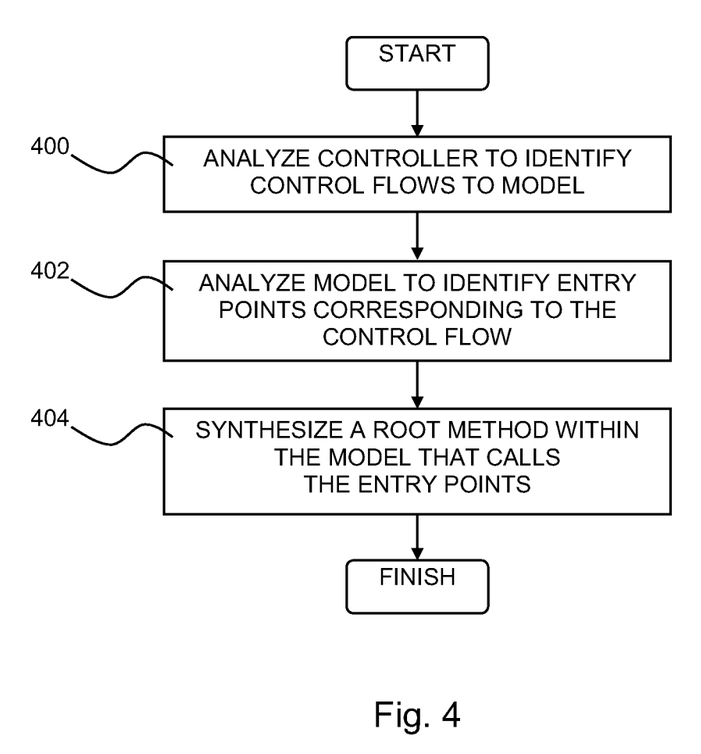
FIG. 4 is a simplified flowchart illustration of an exemplary method of operation of the system of FIG. 1, operative in accordance with an alternative embodiment of the invention.

Reference is now made to FIG. 4, which is a simplified flowchart illustration of an exemplary method of operation of the system of FIG. 1, operative in accordance with an embodiment of the invention. The method of FIG. 4 may be performed to prepare an MVC-based computer software application for static analysis by identifying entry points into the model portion of the application. In the method of FIG. 4, a declarative specification of a controller portion of a computer software application having an MVC architecture is analyzed to identify one or more control flows from the controller portion to a model portion of the computer software application (step 400). For each control flow identified, an entry point corresponding to the control flow is identified within the model portion of the computer software application (step 402). A root method is synthesized, such as within the model portion of the computer software application, where the root method directly or indirectly calls any, and preferably every, one of the identified entry points other than via the controller portion of the computer software application (step 404).

Figure 5A:
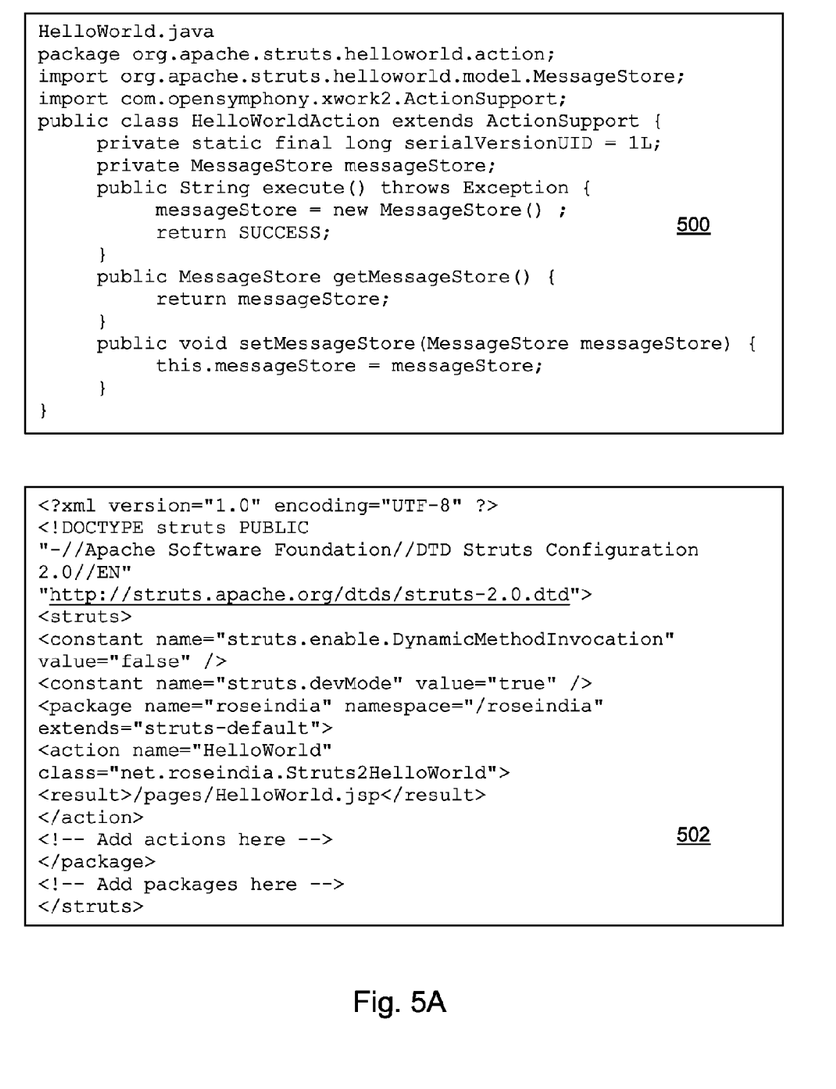
Figure 5B:
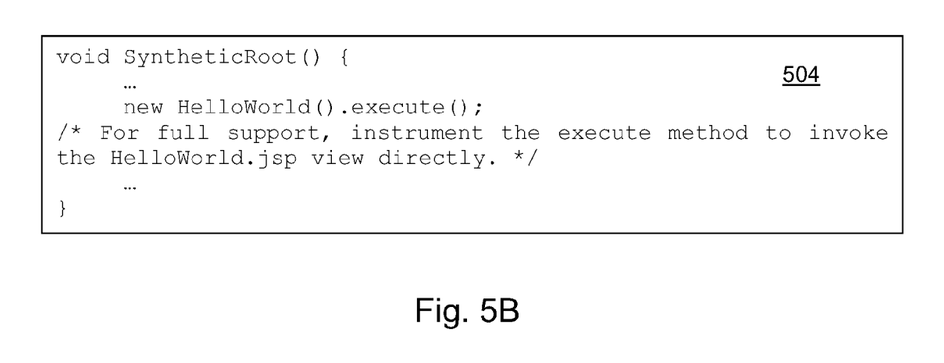

Reference is now made to FIGS. 5A and 5B, which, taken together, is a simplified example of model and controller portions of a computer software application useful in understanding the method of FIG. 4. In FIGS. 5A and 5B a model portion 500 and a controller specification 502 are shown of an application built using the Struts open-source MVC framework. In the example shown, model portion 500 is an action class that acts as the controller in that it responds to a user action, such as clicking an HTML hyperlink, and sends a specific URL to the servlet container. One or more of the action class' methods are executed, and a string result is returned. Based on the value of the result, a specific view page, such as HelloWorld.jsp, is rendered. A synthesized method 504 is shown for inclusion within the model portion of the computer software application during static analysis.

Figure 6:
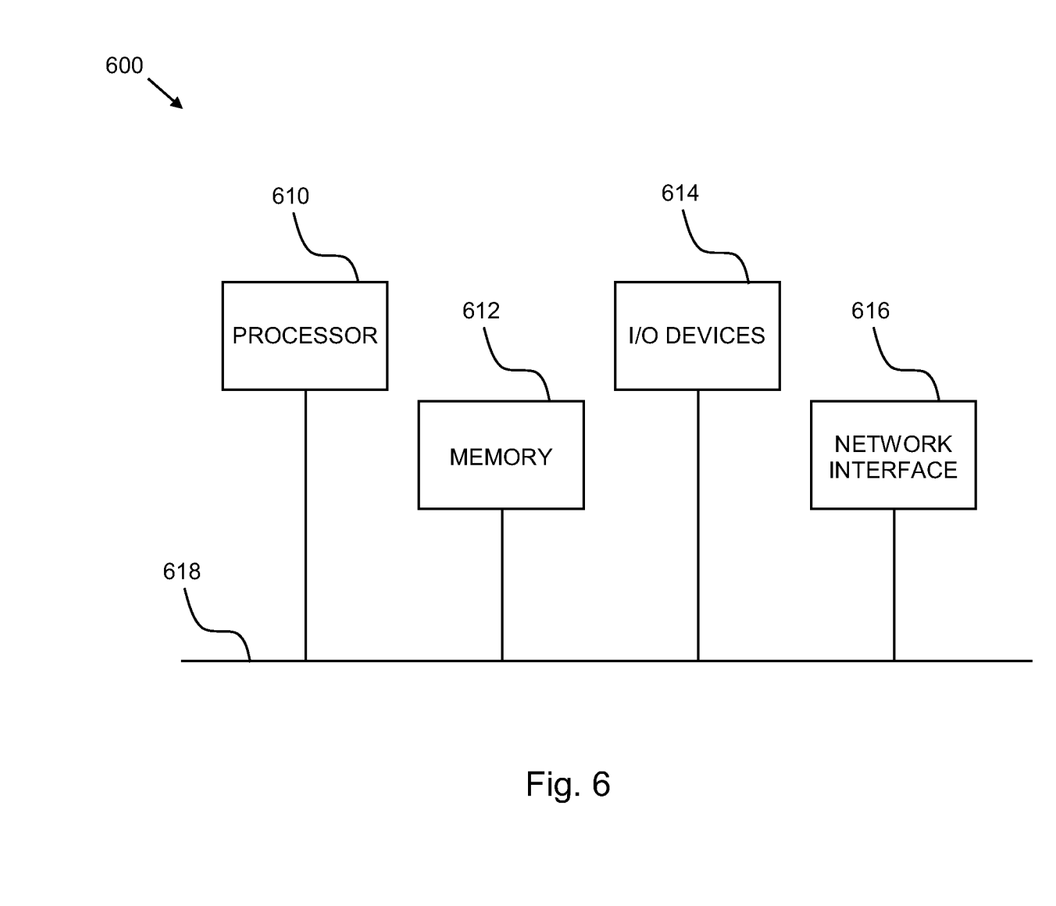
FIG. 6 is a simplified block diagram illustration of an exemplary hardware implementation of a computing system, constructed and operative in accordance with an embodiment of the invention.

Referring now to FIG. 6, block diagram 600 illustrates an exemplary hardware implementation of a computing system in accordance with which one or more components/methodologies of the invention (e.g., components/methodologies described in the context of FIGS. 1, 2, and 4) may be implemented, according to an embodiment of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for preparing a computer software application for static analysis, the method comprising:

identifying a control flow within a model portion of a computer software application, where the control flow passes a value to a controller portion of the computer software application, wherein the computer software application has a model-view-controller architecture, and wherein the computer software application comprises the model portion and the controller portion;

analyzing a declarative specification of the controller portion of the computer software application to identify a view to which the controller portion passes control based on the value, wherein the declarative specification comprises controller logic, wherein the declarative specification is external to the computer software application, and wherein the declarative specification is analyzed to provide improved precision to the static analysis of the model-view-controller architecture; and synthesizing a method within the computer software application, where the method calls the view.

2. The method of claim 1 wherein synthesizing the method comprises:
synthesizing the method within the model portion of the computer software application.

3. The method of claim 1 wherein synthesizing the method comprises:
synthesizing the method within the controller portion of the computer software application.

4. The method of claim 1 wherein synthesizing the method comprises:
synthesizing the method wherein the method indirectly calls the view.

5. The method of claim 4 wherein synthesizing the method comprises:
synthesizing the method wherein the method indirectly calls the view other than via the controller portion of the computer software application.

6. The method of claim 1, the method further comprising:
analyzing the declarative specification of the controller portion of the computer software application to identify the control flow from the controller portion to the model portion of the computer software application;
identifying an entry point within the model portion of the computer software application corresponding to the control flow; and
synthesizing a root method within the computer software application, where the method calls the entry point.

7. The method of claim 6 wherein synthesizing the method comprises:
synthesizing the method within the model portion of the computer software application.

8. The method of claim 6 wherein synthesizing the method comprises:
synthesizing the method within the controller portion of the computer software application.

9. The method of claim 6 wherein synthesizing the method comprises:
synthesizing the method wherein the method indirectly calls the entry point.

10. The method of claim 9 wherein synthesizing the method comprises:
synthesizing the method wherein the method indirectly calls the entry point other than via the controller portion of the computer software application.

11. A system for preparing a computer software application for static analysis, the system comprising:
a model inspector configured to identify a control flow within a model portion of a computer software application, where the control flow passes a value to a controller portion of the computer software application, wherein the computer software application has a model-view-controller architecture, and wherein the computer software application comprises the model portion and the controller portion;

a controller inspector configured to analyze a declarative specification of the controller portion of the computer software application to identify a view to which the controller portion passes control based on the value, wherein the declarative specification comprises controller logic, wherein the declarative specification is external to the computer software application, and wherein the declarative specification is analyzed to provide improved precision to the static analysis of the model-view-controller architecture; and a method synthesizer configured to synthesize a method within the computer software application that calls the view.

12. The system of claim 11 wherein the method synthesizer is configured to synthesize the method within the model portion of the computer software application.

13. The system of claim 11 wherein the method synthesizer is configured to synthesize the method within the controller portion of the computer software application.

14. The system of claim 11 wherein the method indirectly calls the view.

15. The system of claim 14 wherein method indirectly calls the view other than via the controller portion of the computer software application.

16. The system of claim 11, where the controller inspector is further configured to analyze the declarative specification of the controller portion of the computer software application to identify the control flow from the controller portion to the model portion of the computer software application;
where the model inspector is configured to identify an entry point within the model portion of the computer software application corresponding to the control flow; and
where the method synthesizer is configured to synthesize a root method within the computer software application, where the root method calls the entry point.

17. The system of claim 16 wherein the method synthesizer is configured to synthesize the method within the model portion of the computer software application.

18. The system of claim 16 wherein the method synthesizer is configured to synthesize the method within the controller portion of the computer software application.

19. The system of claim 16 wherein the method indirectly calls the entry point.

20. The system of claim 19 wherein the method indirectly calls the entry point other than via the controller portion of the computer software application.

21. A computer program product for preparing a computer software application for static analysis, the computer program product comprising:
a computer-readable storage medium; and
computer-readable program code embodied in said computer-readable storage medium, wherein said computer-readable program code is configured to
identify a control flow within a model portion of a computer software application, where the control flow passes a value to a controller portion of the computer software application, wherein the computer software application has a model-view-controller architecture, and wherein the computer software application comprises the model portion and the controller portion,
analyze a declarative specification of the controller portion of the computer software application to identify a view to which the controller portion passes control based on the value, wherein the declarative specification comprises controller logic, wherein the declarative specification is external to the computer software application, and wherein the declarative specification is analyzed to provide improved precision to the static analysis of the model-view-controller architecture, and synthesize a method within the computer software application that calls the view.

22. The computer program product of claim 21 wherein the computer-readable program is configured to synthesize the method within the model portion of the computer software application.

23. The computer program product of claim 21 wherein the computer-readable program is configured to synthesize the method within the controller portion of the computer software application.

24. The computer program product of claim 21 wherein the method indirectly calls the view.

25. The computer program product of claim 24 wherein method indirectly calls the view other than via the controller portion of the computer software application.

\* \* \* \* \*